3,029,140
ENHANCING THE PHOSPHORUS UPTAKE FROM PLANT GROWTH BY USE OF PHOSPHONIC ACID
John B. Hemwall, Long Beach, Calif., assignor to The Dow Chemical Company, Midland, Mich., a corporation of Delaware
No Drawing. Filed Oct. 13, 1958, Ser. No. 766,709
11 Claims. (Cl. 71—33)

The present invention relates to plant agronomy and particularly relates to improving growth of plant life in soil.

Many types of earth soils are substantially useless for the growth of vegetable and plant life therein, typical of such soils being those of rocky types, shales, basalts and limestone character. Such soils or potential soil material are present in the earth's crust in huge amounts but they have heretofore been unavailable, from a practical standpoint, for the useful and economical growth of vegetable and plant life therein.

The basic importance of soil in food production requires that attention be directed to chemical composition of soil in relation to crop needs and particularly to availability of the elements to the plants. Plants are able to utilize only a small fraction of the total quantity of any element present in soils. Although many primary minerals may be considered store-houses of plant nutrients, the release of elements is often not sufficiently rapid in the weathering process to support intensive crop production. Among the soil components essential for plant growth is phosphorus. The phosphorus is present in soil in both organic and in inorganic combinations. Although it is present proponderantly in inorganic combination, it may be found in organic combination from as little as 3 percent in some soils to as much as 75 percent in other soils. In organic combination, phosphorus occurs in phospholipids, nucleic acids, inositol phosphates, phosphoproteins, etc. In inorganic combination, the phosphorus occurs substantially completely as salts of orthophosphoric acid.

Phosphorus, to be beneficial to the plant, must be absorbed from the soil by the plant root system. The understanding of the processes taking place during the uptake of phosphorus is still incomplete but it has been observed that plant response to phosphorus is a function of the solubility of the phosphorus present and it is believed that the anionic form $H_2PO_4^-$ is the form most utilized by the plants. It has further been observed that any factor altering this solubility will alter plant growth. Phosphorus as well as other minerals in the soil are frequently "fixed," i.e., the readily soluble plant nutrients are changed to less soluble forms by reaction with inorganic or organic components of the soil with the result that the nutrients become restricted in their mobility in the soil and suffer a decrease in availability to plants. Routes whereby the nutrient elements become fixed have been postulated as chemical or physical adsorption and double decomposition. It is generally accepted that more than one route is involved in the fixation process. It is desirable in the practice of agronomy that a method be found to make the "fixed" phosphorus more available for plant nutrition. Furthermore, it is desirable to prevent or to slow down this fixation of phosphorus and to maintain the phosphorus in a form available to plants.

It has been found, according to the present invention, that by the addition of small quantities of a phosphonic acid compound to growth medium, phosphorus present in the soil or added thereto in fertilizer compositions is made available and maintained available in a form assimilable by plant life. It has further been found that by the practice of the present invention, the phosphorus uptake from soil by plants is enhanced. This is manifest in more rapid growth, earlier maturity, greater health and greater yields of plants. Furthermore, it has been found that by the incorporation of the phosphonic acid compound in soil, the phosphorus made available to the plant is greater than the effect obtained by doubling the amount of phosphate fertilizer added to the soil.

The phosphonic acid compounds suitable for the practice of this invention are phosphonic acids, their salts and esters. More specifically, the phosphonic acid compounds may be defined as (1) (1,4-piperazinylenedimethylene)diphosphonic acid; (2) a compound represented by the formula

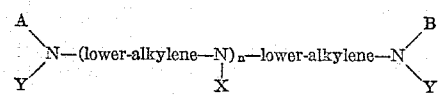

wherein Y represents

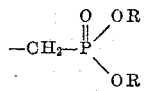

wherein each R is independently selected from the group consisting of hydrogen, alkali metal, ammonium, lower alkyl ammonium, lower hydroxyalkyl ammonium and lower alkyl containing from 1 to 4 carbon atoms, inclusive; A and B are independently selected from the group consisting of hydrogen, benzyl, lower alkyl containing from 1 to 4 carbon atoms, inclusive, and Y; X is selected from the group consisting of hydrogen and Y; and $n$ is selected from the group consisting of 0 and 1; or (3) hydrogen halide addition salts of (1) and (2).

By "lower alkylene" is meant ethylene, propylene or trimethylene. By the expressions "lower alkyl" and "lower hydroxyalkyl" are meant radicals containing from 1 to 4 carbon atoms, inclusive. Suitable salts of phosphonic acid compounds are the water soluble salts and include such salts as sodium, potassium, lithium, methylammonium, dimethylammonium, 2-hydroxyethylammonium, trimethylammonium, triethylammonium, propylammonium, ethyl(2-hydroxyethyl)ammonium, 2-hydroxypropylammonium, tris(2-hydroxyethyl)ammonium, butylammonium and ispropylammonium. By the expression "hydrogen halide salts" is meant hydrochloride and hydrobromide salts.

Particularly useful because of the high degree of benefitting plants are the phosphonic acid compounds represented by the structure (a)

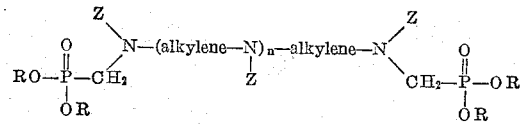

wherein each Z independently may be hydrogen or

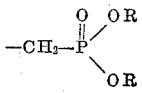

and R is as previously defined, or (b)

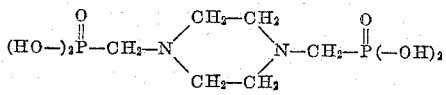

and their hydrogen halide salts.

These phosphonic acid compounds are liquids or solids. They may be applied to growth medium in any suitable form and by any means usually employed for administration of organic chemicals to growth medium. By the expression "growth medium" is meant any medium suitable for the planting and growing of vegetables and plant life. Thus, the expression is meant to encompass not only soil but also sand, liquid nutrient medium and "synthetic soil" compositions such as sponge rock, peat, etc. and material sold under tradenames such as "Black Magic." However, the invention primarily is concerned with the application of phosphonic acid compounds to natural soil. Included in the expression "natural soil" is a range of soil compositions from that which contains predominantly mineral matter to that which is relatively high in organic matter. In the practice of this invention the phosphonic acid compound may be added to acid or alkaline soil, to highly calcareous soil or soil containing as much as from 50 to 80 percent organic matter. It is suitable for use in both sandy soil and in heavy clay soil.

In carrying out the operation in accordance with the present invention, the phosphonic acid compound is distributed in plant growth media. It may be distributed in an unmodified form but is preferably intimately dispersed in a carrier with or without the inclusion of other additaments. By "carrier" is meant any solid or liquid agent with which the phosphonic acid compound may be employed. Thus, the carrier may be water, aqueous dispersions, organic liquid carriers, solid fertilizers, an aqueous fertilizer composition or inert dust. Administration to the soil of the phosphonic acid compound as a constituent of phosphate containing fertilizer compositions constitutes a preferred embodiment of the present invention.

In applications to soil, good results are obtained when the phosphonic acid compound is supplied in an amount of from 0.25 to 250 parts or more per million parts by weight of the growth medium. In applications to soil, good results are obtained when the phosphonic acid compound is distributed at a rate of from 1 to 20 pounds or more per acre and through such cross-section of the soil as to provide for the presence therein of an effective concentration of the phosphonic acid compound. The required amounts of phosphonic acid compound may be supplied in from 1 to 100 gallons of organic solvent carrier, in from 1 to 27,000 or more gallons of aqueous carrier, or in from about 20 to 2,000 pounds or more of solid carrier per acre treated. When an organic solvent carrier is employed, it may be further dispersed in above volume of aqueous liquid carrier.

The exact concentration of phosphonic acid compound to be employed in compositions for the treatment of growth media is not critical, provided that a minimum effective dosage is supplied in the media. The concentration of the phosphonic acid compound may vary from 0.01 percent by weight to 95 percent by weight of the composition, depending on whether the composition is a treating composition or a concentrate composition and whether it is in the form of a solid or a liquid.

Liquid concentrate compositions commonly contain from 2 to 50 percent or more by weight of the phosphonic acid compound. These concentrate compositions are generally aqueous compositions although other solvents such as acetone, diisobutyl ketone, isopropyl alcohol, and petroleum may be employed as liquid carrier. Such concentrate compositions preferably contain fertilizer and may contain dispersing agents, emulsifying agents such as condensation products of alkylene oxides of phenols and organic acids, alkyl aryl sulfonates, polyoxyalkylene derivatives of sorbitan esters, complex ether alcohols, mahogany soaps and the like. Liquid concentrate compositions may be diluted to prepare treating compositions. Liquid treating compositions preferably contain from 0.01 to 10 percent by weight of the phosphonic acid compound.

Solid concentrate compositions commonly contain from 1 to 20 percent of the phosphonic acid compound. In such compositions, the phosphonic acid compound may be intimately dispersed with fertilizer or inert solid material such as solid surface-active dispersing agents, chalk, talc, pyrophyllite, attapulgite, fuller's earth, or bentonite.

Such concentrate compositions may be further dispersed in fertilizer or other innocuous adjuvants to obtain treating compositions. When a fertilizer is used as carrier, the fertilizer may be organic or inorganic. Suitable fertilizers include phosphate containing fertilizers such as superphosphate fertilizers, mixed nitrogen-phosphorus-potassium fertilizers, ammonium nitrate and organic fertilizers. Solid treating compositions preferably contain from 0.1 to 25 percent by weight of the phosphonic acid compound. Furthermore, the solid concentrate compositions may be dispersed in water with or without added dispersing agent or agents to prepare aqueous soil treating compositions as previously described.

The preferred embodiment of the present invention comprises distributing the phosphonic acid compound in a phosphate-containing fertilizer composition. Such compositions may contain the phosphonic acid compound in from 0.5 to 20 percent by weight based on the weight of phosphorus in the fertilizer when the latter is calculated as phosphorus pentoxide.

In carrying out the operations in accordance with the present invention, a phosphonic acid compound or a composition containing a phosphonic acid compound is distributed in any suitable fashion in soil or other growth media, such as by simply mixing with growth media, by applying as a band beneath the seed row, by applying to the surface of soil and thereafter dragging or discing into the soil to the desired depth, or by employing a liquid carrier to accomplish the penetration and impregnation. The application of the spray and dust compositions may be carried out by conventional methods, e.g., with power sprayers or dusters, boom and hand sprayers, etc. Further, the distribution may be accomplished by introducing the phosphonic acid compound into the water employed to irrigate the soil. If desired, the unmodified material may be employed, but generally a liquid or solid carrier composition containing the phosphonic acid compound is applied to the growth medium.

The following examples illustrate the invention but are not to be construed as limiting.

EXAMPLE 1

An aqueous treating composition containing labeled phosphoric acid was prepared by intimately mixing 45 parts by weight of [ethylenebis(nitrilodimethylene)] tetraphosphonic acid having the formula

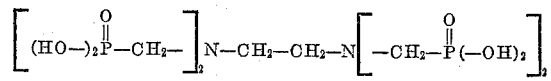

510 parts by weight of labeled phosphoric acid ($H_3P^{32}O_4$), 322 parts by weight of ammonium nitrate and 60,000 parts by weight of water.

A similar treating composition was prepared in which [ethylenebis(nitrilodimethylene)]tetraphosphonic acid was replaced by an equal amount by weight of the P,P'-diethyl dihydrogen [ethylenebis(iminomethylene)] diphosphonate having the formula

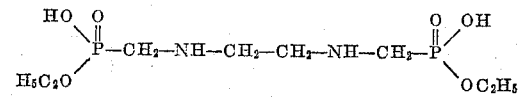

Still another similar treating composition was prepared in which the phosphonic acid compound was [propylenebis(nitrilodimethylene)]tetraphosphonic acid having the formula

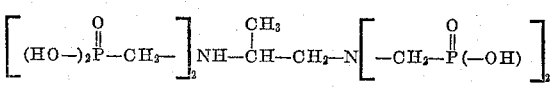

Six 10 milliliter aliquots of each of the compositions thus prepared were applied as a drench to pots containing 150 grams of soil having three tomato plants of about 2 inches in height growing therein. After treatment, the soil contained the following concentration of materials on a dry weight basis.

| Material: | Parts by weight per million parts by weight of soil |
|---|---|
| Phosphonic acid compound | 50 |
| Labeled phosphoric acid ($H_3P^{32}O_4$), calculated as $P_2O_5$ | 375 |
| Ammonium nitrate, calculated as nitrogen | 125 |

A check treatment was carried out in a similar manner employing a similar treating composition but containing no phosphonic acid compound.

The plants were allowed to grow for two weeks after treatment and the aerial portions then harvested. The harvested plants were then dried. The entire aerial portions of the plants from each pot were then pressed into planchets with a 2-ton press for making a count of radioactive phosphorus. From the unit weight of the sample and the total weight of harvested portions of the plant, the total uptake of radioactive phosphorus was determined. From the averages of the total uptake of the radioactive phosphorus in the six samples treated with one of the phosphonic acid compounds and the averages of the total uptake in the check determinations, the percent increase in phosphorus uptake by the plants grown on soil treated with said phosphonic acid compound over the untreated check plants were calculated.

The operations were carried out simultaneously employing different types of soil. The results were as follows:

Table I

| Phosphonic Acid Compound Component in Composition | Soil Sample | Percent Increase in Phosphorus Uptake |
|---|---|---|
| [Ethylenebis(nitrilodimethylene)]-tetraphosphonic acid | A | 37 |
| Do | E | 49 |
| Do | F | 41 |
| P,P'-diethyldihydrogen[ethylene-bis(iminomethylene)]diphosphonate | A | 34 |
| Do | D | 35 |
| Do | E | 60 |
| Do | F | 59 |
| Do | G | 20 |
| Do | H | 29 |
| [Propylenebis(nitrilodimethylene)]-tetraphosphonic acid | A | 47 |
| Do | B | 29 |
| Do | C | 20 |
| Do | D | 31 |
| Do | E | 42 |
| Do | F | 44 |
| Do | G | 21 |

A = Slightly saline, high organic matter (9.3 percent), acid (pH 5.6), loam.
B = Slightly saline, low organic matter (1.9 percent), alkaline (pH 7.7), slightly calcareous (2.3 percent calcium carbonate), sandy loam.
C = Slightly saline, low organic matter (1.4 percent), alkaline (pH 7.7), non-calcareous, sandy loam.
D = Highly saline, low organic matter (1.3 percent), alkaline (pH 7.4), non-calcareous, sandy loam.
E = Low organic matter (0.8 percent), alkaline (pH 7.7), slightly calcareous (1.5 percent calcium carbonate), sandy loam.
F = Low organic matter (0.6 percent), acid (pH 5.8), sandy loam.
G = Slightly saline, moderate organic matter (2.6 percent), alkaline (pH 7.85), moderately calcareous (6.4 percent calcium carbonate), loam.
H = Low organic matter, slightly acid (pH 6.6), clay loam.

EXAMPLE 2

In a similar manner other treating compositions were prepared in which the phosphonic acid compound was (a) [ethylenebis(nitrilodimethylene)]tetraphosphonic acid·dihydrobromide and (b) [ethylenebis(iminomethylene)]diphosphonic acid·dihydrobromide. The treating compositions as well as a check containing no phosphonic acid compound were applied as drench at a rate described in Example 1 to pots containing 150 grams of calcareous soil having a pH of 7.8, and in which three tomato plants were growing. The plants were allowed to grow, then harvested and determinations made on total uptake of radioactive phosphorus as previously described. The uptake of radioactive phosphorus by plants grown on soil treated with the phosphonic acid compound were compared with the uptake in check determinations and found to be as follows.

Phosphonic acid compound component in composition:

| | Percent increase in phosphorus uptake |
|---|---|
| [Ethylenebis(nitrilodimethylene)]tetraphosphonic acid·dihydrobromide | 25 |
| [Ethylenebis(iminomethylene)]diphosphonic acid·dihydrobromide | 41 |

EXAMPLE 3

In a manner similar to that described in Examples 1 and 2, an aqueous treating composition was prepared in which the phosphonic acid compound was (1,4-piperazinylenedimethylene)diphosphonic acid·hydrobromide having the structure

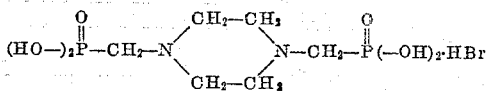

The above composition as well as a check composition containing no phosphonic acid compound were applied as drench at a rate previously described to pots containing tomato plants growing in calcareous soil having a pH of 7.8. The plants were then allowed to grow, harvested, and determinations made on uptake of radioactive phosphorus as previously described. It was found that the percent increase in phosphorus uptake by the plants grown on soil treated with phosphonic acid compound over the check plants was 40 percent.

EXAMPLE 4

A modified fertilizer composition was prepared by intimately mixing 5.73 grams of commercial triple superphosphate (0–45–0) fertilizer with 0.26 gram [propylenebis(nitrilodimethylene)]tetraphosphonic acid. In this and subsequent fertilizer compositions, the values in the parenthesis indicate the available components as follows: (N—$P_2O_5$—$K_2O$). The above composition was uniformly distributed in a band application along the bottom of a 2½ inch deep furrow in a seed plot of alkaline loamy sand soil. This corresponds to administration of 75 pounds of phosphorus pentoxide plus 7.5 pounds of phosphonic acid per acre.

In simultaneous operations, 5.73 grams (corresponding to 75 pounds phosphorus pentoxide per acre) of unmodified commercial triple superphosphate (0–45–0) fertilizer and 11.46 grams (corresponding to 150 pounds phosphorus pentoxide per acre) of unmodified commercial triple superphosphate (0–45–0) fertilizer were distributed in other 2½ inch deep furrows as checks.

About 2 inches of soil was then placed in the furrow and tomato seeds were then planted therein and covered with about ½ inch of soil. The seeds were then allowed to sprout and as soon as the true leaves started to form on the tomato seedlings, the tomato plants were thinned to about 24 plants per 18-inch row. About five weeks later, the plants were harvested and determinations made on the phosphorus uptake by the plants. The analysis for phosphorus was carried out chemically by digesting the harvested plant with nitric-perchloric acid mixture according to a method similar to that described on page 294 of "Soil and Plant Analysis" by C. S. Piper, Interscience Publishers, Inc., New York, 1944. The solutions resulting from the digestion were then analyzed for phosphorus employing the phosphomolybdate blue method as described by S. R. Dickman and R. H. Bray in Industrial and Engineering Chemistry, Analytical Edition, 12, 665–668, (1940).

The results of these determinations showed that the phosphorus uptake of the plants treated with a fertilizer composition modified with [propylenebis(nitrilodimethylene)]tetraphosphonic acid was greater than that of plants treated with twice the amount of phosphate fertilizer as can be seen from the following figures:

|  | Percent increase in phosphorus uptake |
|---|---|
| Modified composition (75 pounds of $P_2O_5$ per acre + 7.5 pounds of [propylenebis(nitrilodimethylene)]-tetraphosphonic acid per acre) | 42 |
| Check (75 pounds of $P_2O_5$ per acre) | 0 |
| Check (150 pounds of $P_2O_5$ per acre) | 30 |

EXAMPLE 5

Modified fertilizer compositions containing varying concentrations of the phosphonic acid compound were prepared by intimately mixing P,P'-diethyl dihydrogen [ethylenebis(iminomethylene)]diphosphonate with commercial triple superphosphate fertilizer as follows.

Composition A: Parts by weight
   Triple superphosphate (0–45–0) _____ 5670
   Phosphonic acid compound _____ 32
Composition B:
   Triple superphosphate (0–45–0) _____ 5670
   Phosphonic acid compound _____ 64
Composition C:
   Triple superphosphate (0–45–0) _____ 5670
   Phosphonic acid compound _____ 128

These modified fertilizer compositions as well as an unmodified fertilizer check were applied to plots of sandy loam soil having a pH of 5.8 and of low organic content (0.6 percent) in a broadcast application by intimately admixing with the soil. The amount of fertilizer composition employed was sufficient to supply 100 pounds of phosphate (calculated as phosphorus pentoxide) per acre. After treatment of the soil, the plots were planted with tomato seeds. After five weeks, the plants were harvested and a determination made of the phosphorus content, employing the digestion and phosphomolybdate method described in Example 4.

The results as percent increase in phosphorus uptake by plants grown in soil treated with modified fertilizer compositions over plants grown on unmodified fertilizer as checks are as follows:

| Composition | Rate of phosphonic acid compound in pounds/acre | Percent increase in phosphorus uptake |
|---|---|---|
| A | 1.25 | 22 |
| B | 2.5 | 23 |
| C | 5.0 | 31 |

EXAMPLE 6

An aqueous dispersion was prepared in which the phosphonic acid compound was [(phosphonomethyl)bis(ethylene-nitrilodimethylene)]tetraphosphonic acid·dihydrobromide having the formula

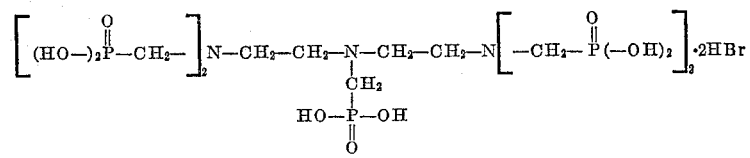

The composition of the aqueous dispersion was as follows.

| Component: | Parts by weight per million parts by weight of aqueous dispersion |
|---|---|
| Phosphonic acid compound | 750 |
| Ammonium nitrate | 5400 |
| 85 percent phosphoric acid (sp. gr., 1.7) | 8500 |

The composition thus prepared was applied as a drench to pots containing 150 grams of soil and in which three tomato plants of about 2 inches in height were growing. After treatment, the soil contained the following concentration of materials on a dry weight basis.

| Component: | Parts by weight per million parts by weight of soil |
|---|---|
| Phosphonic acid compound | 50 |
| 85 percent phosphoric acid (calculated as phosphorus pentoxide) | 375 |
| Ammonium nitrate (calculated as nitrogen) | 125 |

A check treatment was carried out in a similar manner employing a composition containing no phosphonic acid compound.

The plants were allowed to grow for two weeks after treatment. The aerial portions of the plants then harvested and weighed, and determinations made on the phosphorus uptake by the plants. The determinations were carried out employing the method described in Example 4. From the average phosphorus content of the plants treated with the composition containing the phosphonic acid compound and the phosphorus content of the plants in the check determination, the percent increase of phosphorus uptake in the treated plant to the untreated check plant was calculated. The value was found to be 25 percent.

EXAMPLE 7

Modified fertilizer compositions containing various phosphonic acid compounds are prepared as follows:

Composition I: Parts by weight
   Triple superphosphate (0–45–0) _____ 2222
   [Ethylenebis(nitrilodimethylene)]-tetraphosphonic acid, P,P',P'',P'''-tetraethyl tetrahydrogen ester _____ 100
Composition II:
   Triple superphosphate (0–45–0) _____ 2222
   [Ethylenebis(nitrilodimethylene)]-tetraphosphonic acid, octaethyl ester _____ 100
Composition III:
   Triple superphosphate (0–45–0) _____ 2222
   [Ethylenebis(iminomethylene)]diphosphonic acid, tetra-sodium salt _____ 100
Composition IV:
   Triple superphosphate (0–45–0) _____ 2222
   [Ethylenebis(iminomethylene)]diphosphonic acid, tetra-(methyl-ammonium) salt _____ 100
Composition V:
   Superphosphate (0–19–0) _____ 5270
   (1,4-piperazinylenedimethylene)diphosphonic acid _____ 100
Composition VI:
   "Ammo-phos fertilizer" (16–20–0) _____ 5000
   [Ethylenebis(iminomethylene)]diphosphonic acid _____ 100
Composition VII:
   "10-10-10 fertilizer" (10–10–10) _____ 10,000
   [Ethylenebis(nitrilodimethylene)]-tetraphosphonic acid _____ 100

These compositions correspond to the administration of 75 pounds of phosphorus pentoxide plus 7.5 pounds of phosphonic acid compound per acre. These compositions are uniformly distributed in separate operations in band applications and planted with tomato seeds. Check operations are simultaneously carried out by applying (a) the same amount of fertilizer and (b) double the amount of fertilizer but in each case omitting the phosphonic acid compound. After about six weeks the plants are harvested and determined for phosphorus uptake by chemical analysis. The results show that all of the plants grown on soil treated with modified fertilizer compositions have a phosphorus uptake equal to or greater than that obtained by doubling the amount of fertilizer.

EXAMPLE 8

In a similar manner a modified fertilizer composition is prepared by mixing 2970 parts by weight of triple superphosphate (0–45–0) with 100 parts by weight of [2 - (benzylphosphonomethylamino)ethyliminodimethylene]diphosphonic acid having the formula

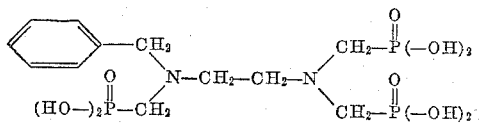

The modified fertilizer composition as well as an unmodified fertilizer check is applied to plots of sandy loam soil (of low organic content and having a pH of 5.8) by intimately admixing with the soil in an amount sufficient to supply 100 pounds of phosphate (as $P_2O_5$) and 7.5 pounds of phosphonic acid compound per acre. After treatment of the soil, the plots are planted with tomato seeds. After five weeks the plants are harvested and determined for their phosphorus content. It is found that the plants grown on the soil treated with modified fertilizer have a higher phosphorus content than the plants grown on soil treated with unmodified fertilizer.

EXAMPLE 9

In a similar operation, it is found that the uptake of phosphorus by plants is greater in plants grown on soil treated with a fertilizer composition modified with [ethylene-bis(butyliminomethylene)]diphosphonic acid having the structure

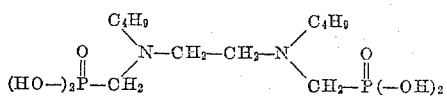

than in plants grown on soil treated with unmodified fertilizer.

EXAMPLE 10

In a similar operation, the uptake of phosphorus by plants is greater in plants grown on soil treated with [(phosphonomethyl) bis (ethylenenitrilodimethylene)]tetraphosphonic acid than in plants grown on soil treated with unmodified fertilizer.

EXAMPLE 11

Aqueous dispersions were prepared having the following compositions.

| Component: | Parts by weight per million parts by weight of aqueous dispersion |
|---|---|
| Phosphonic acid compound | 750 |
| Ammonium nitrate | 5400 |
| 85 percent phosphoric acid (sp. gr., 1.7) | 8500 |

The phosphonic acid compounds employed were (A) [propylenebis - (nitrilodimethylene)]tetraphosphonic acid and (B) P,P' - diethyldihydrogen[ethylene(iminomethylene)]diphosphonate. These compositions were applied as drench to pots containing tomato plants growing in 150 grams of soil in an amount sufficient to supply the following concentration of materials on a dry weight basis.

| Component: | Parts by weight per million parts by weight of soil |
|---|---|
| Phosphonic acid compound | 50 |
| Ammonium nitrate (calculated as nitrogen) | 125 |
| Phosphoric acid (calculated as phosphorus pentoxide) | 375 |

For check treatment, similar pots containing tomato plants were fertilized at a rate of 75 pounds of $P_2O_5$ per acre (equal to 375 parts by weight of phosphorus pentoxide per million parts by weight of soil) and at a rate of 150 pounds of $P_2O_5$ per acre (equal to 750 parts by weight of phosphorus pentoxide per million parts by weight of soil).

The plants were allowed to grow for two weeks after treatment and the aerial portions of the plants were harvested, dried and the dried weights compared with the check determination at a rate of 75 pounds of $P_2O_5$ per acre. The results were as follows.

| Treating composition: | Percent increase in dry weight of plant |
|---|---|
| (A) [Propylenebis(nitrilodimethylene)]tetraphosphonic acid | 22 |
| (B) P,P' - diethyl dihydrogen [ethylene(iminomethylene)]diphosphonate | 23 |
| (C) Check (75 pounds of $P_2O_5$ per acre) | 0 |
| (D) Check (150 pounds of $P_2O_5$ per acre) | 17 |

The phosphonic acid compounds employed in the present invention may be prepared by reacting together piperazine or an appropriate alkylenepolyamine with at least two molar proportions each of formaldehyde and an O,O-di-(lower alkyl)phosphite. The resulting ester product may then be mixed with hydrohalic to form a phosphonic acid or its hydrogen halide addition salt. If desired, the acid may be treated with alkali metal or ammonium hydroxide or amine base to form salts of said phosphonic acids.

I claim:

1. A method for enhancing the phosphorus uptake from plant growth medium by plants which comprises dispersing through said growth medium a phosphonic acid compound selected from the group consisting of (1) (1,4-piperazinylenedimethylene)-diphosphonic acid; (2) a compound represented by the formula

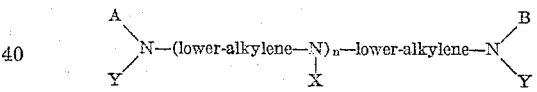

wherein Y represents

wherein each R is independently selected from the group consisting of hydrogen, alkali metal, ammonium, lower alkyl ammonium, lower hydroxyalkyl ammonium and lower alkyl containing from 1 to 4 carbon atoms, inclusive; A and B are independently selected from the group consisting of hydrogen, benzyl, lower alkyl containing from 1 to 4 carbon atoms, inclusive, and Y; X is selected from the group consisting of hydrogen and Y; and $n$ is selected from the group consisting of 0 and 1; and (3) hydrogen halide addition salts of (1) and (2).

2. A method according to claim 1 wherein the phosphonic acid compound is P,P'-diethyl dihydrogen [ethylenebis(iminomethylene)]diphosphonate.

3. A method according to claim 1 wherein the phosphonic acid compound is [ethylenebis(nitrilodimethylene)]tetraphosphonic acid.

4. A method according to claim 1 wherein the phosphonic acid compound is [propylenebis(nitrilodimethylene)]tetraphosphonic acid.

5. A method according to claim 1 wherein the phosphonic acid compound is [ethylenebis(iminomethylene)]diphosphonic acid.

6. A method according to claim 1 wherein the phosphonic acid compound is [(phosphonomethyl)bis(ethylenenitrilodimethylene)]tetraphosphonic acid.

7. A method according to claim 1 wherein the phosphonic acid compound is (1,4-piperazinylenedimethylene)-diphosphonic acid.

8. A method according to claim 1 wherein the phosphonic acid compound is added in an amount sufficient to give a concentration of a least 0.25 part by weight per million parts by weight of the growth medium.

9. A method for treating plant growth media to increase phosphorus uptake therefrom which comprises introducing into plant growth media a composition comprising an adjuvant for treating growth media in intimate admixture with a phosphonic acid compound selected from the group consisting of (1) (1,4-piperazinylenedimethylene)diphosphonic acid; (2) a compound represented by the formula

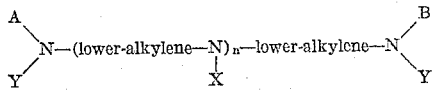

wherein Y represents

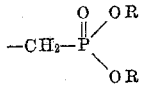

wherein each R is independently selected from the group consisting of hydrogen, alkali metal, ammonium, lower alkyl ammonium, lower hydroxyalkyl ammonium and lower alkyl containing from 1 to 4 carbon atoms, inclusive; A and B are independently selected from the group consisting of hydrogen, benzyl, lower alkyl containing from 1 to 4 carbon atoms, inclusive, and Y; X is selected from the group consisting of hydrogen and Y; and $n$ is selected from the group consisting of 0 and 1; and (3) hydrogen halide addition salts of (1) and (2).

10. A method according to claim 9 wherein the growth medium treating adjuvant is a phosphate containing fertilizer composition.

11. In the fertilization of plant growth medium with a phosphate containing fertilizer, the step which comprises supplying to plant growth medium substantially simultaneously with the phosphate containing fertilizer a phosphonic acid compound selected from the group consisting of (1) (1,4-piperazinylenedimethylene)diphosphonic acid; (2) a compound represented by the formula

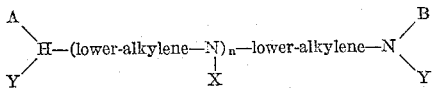

wherein Y represents

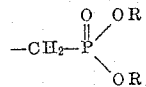

wherein each R is independently selected from the group consisting of hydrogen, alkali metal, ammonium, lower alkyl ammonium, lower hydroxyalkyl ammonium and lower alkyl containing from 1 to 4 carbon atoms, inclusive; A and B are independently selected from the group consisting of hydrogen, benzyl, lower alkyl containing from 1 to 4 carbon atoms, inclusive, and Y; X is selected from the group consisting of hydrogen and Y; and $n$ is selected from the group consisting of 0 and 1; and (3) hydrogen halide addition salts of (1) and (2), said compound being supplied in an amount sufficient to increase phosphorus uptake by plants.

References Cited in the file of this patent

UNITED STATES PATENTS

| | | |
|---|---|---|
| 2,706,194 | Morris et al. | Apr. 12, 1955 |
| 2,714,064 | Morris et al. | July 26, 1955 |
| 2,841,486 | Osborn et al. | July 1, 1958 |
| 2,843,617 | Kaufmann | July 15, 1958 |
| 2,870,190 | Burgert | Jan. 20, 1959 |
| 2,959,590 | Moss | Nov. 8, 1960 |